US008516555B2

(12) United States Patent
Lee et al.

(10) Patent No.: US 8,516,555 B2
(45) Date of Patent: Aug. 20, 2013

(54) METHOD AND SYSTEM FOR AUTHENTICATING PAY-PER-USE SERVICE USING EAP

(75) Inventors: Byoung-Joon Lee, Seongnam-si (KR); Alper Yegin, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1342 days.

(21) Appl. No.: 11/359,499

(22) Filed: Feb. 23, 2006

(65) Prior Publication Data

US 2006/0190994 A1 Aug. 24, 2006

Related U.S. Application Data

(60) Provisional application No. 60/656,107, filed on Feb. 24, 2005.

(30) Foreign Application Priority Data

Nov. 16, 2005 (KR) ................ 2005-109718

(51) Int. Cl.
*G06F 7/04* (2006.01)
*H04L 9/32* (2006.01)

(52) U.S. Cl.
USPC ............... 726/4; 726/3; 713/170; 713/181

(58) Field of Classification Search
USPC ............ 726/3–10; 713/150–154, 168, 170, 713/181; 455/406, 408
See application file for complete search history.

(56) References Cited

U.S. PATENT DOCUMENTS

| | | | |
|---|---|---|---|
| 6,970,693 B2 * | 11/2005 | Madour et al. ............. | 455/408 |
| 2002/0012433 A1 * | 1/2002 | Haverinen et al. ........... | 380/247 |
| 2003/0028763 A1 * | 2/2003 | Malinen et al. ............. | 713/155 |
| 2003/0157926 A1 * | 8/2003 | Ala-Laurila et al. .......... | 455/406 |
| 2004/0103282 A1 * | 5/2004 | Meier et al. .................. | 713/171 |
| 2004/0181692 A1 * | 9/2004 | Wild et al. .................... | 713/201 |
| 2004/0192264 A1 * | 9/2004 | Liu et al. .................... | 455/414.1 |
| 2004/0240412 A1 * | 12/2004 | Winget ........................ | 370/331 |
| 2004/0248547 A1 * | 12/2004 | Philsgard et al. ............. | 455/405 |

OTHER PUBLICATIONS

Menezes, Alfred J. et al. "Handbook of Applied Cryptography," Dec. 16, 1996, CRC Press, pp. 322-330.*
Office Action issued on Oct. 19, 2006 from the Korean Intellectual Property Office for Korean Patent Application No. 2005-109718.
Introduction to 802.IX for Wireless Local Area Networks, Interlink Networks, Inc. (2002).

* cited by examiner

*Primary Examiner* — Darren B Schwartz
(74) *Attorney, Agent, or Firm* — NSIP Law

(57) ABSTRACT

A method and system for authenticating a pay-per-use service using an extensible authentication protocol (EAP). The method includes requesting a client to provide an EAP ID to be used in the service when a service request signal is received from a client; transmitting an EAP payment method (EAP_CC) request signal for requesting management information of the client when the EAP ID is received; after receiving an EAP_CC response signal that includes the management information of the client, retransmitting the EAP_CC response signal to an authentication/authorization/accounting (AAA) backend server that possesses the management information of the client; and after receiving an EAP_CC approval signal for approving the service request of the client from the AAA backend server, retransmitting the EAP_CC approval signal to the client. According to the method, a user can perform an authentication of the pay-per-use service even if the user is a non-subscriber of a specified service.

34 Claims, 1 Drawing Sheet

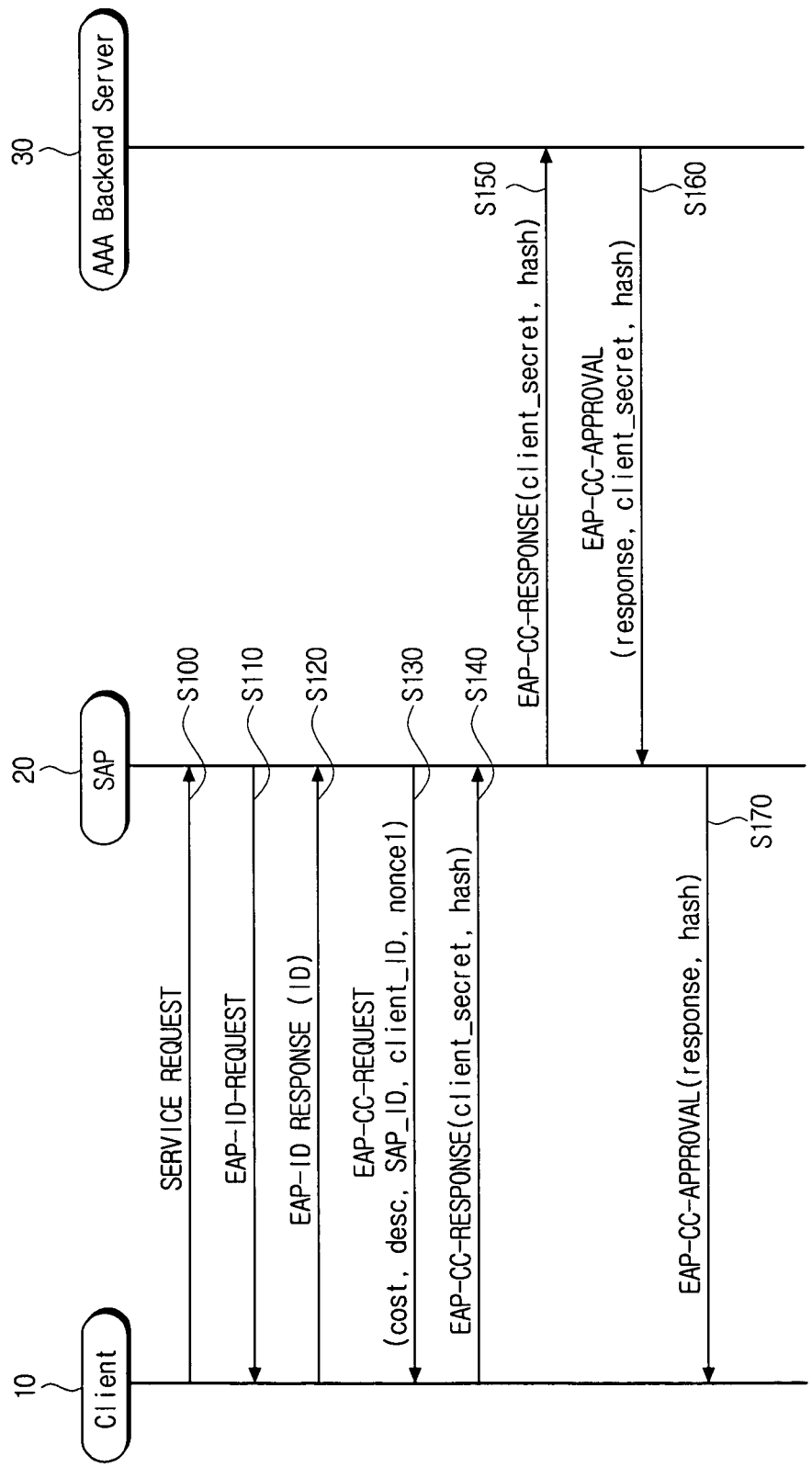

METHOD AND SYSTEM FOR AUTHENTICATING PAY-PER-USE SERVICE USING EAP

CROSS-REFERENCE TO RELATED APPLICATIONS

This application claims the benefits of U.S. Provisional Application No. 60/656,107, filed Feb. 24, 2005, in the United States Patent and Trademark Office, and Korean Patent Application No. 2005-109718, filed Nov. 16, 2005, in the Korean Intellectual Property Office, the entire disclosures of which are incorporated herein by reference.

BACKGROUND OF THE INVENTION

1. Field of the Invention

An aspect of the present invention relates to a method and a system for authenticating a pay-per-use service using an extensible authentication protocol (EAP), and more particularly, to a method and a system for authenticating a pay-per-use service using an EAP that is provided for a service non-subscriber who uses a credit card or other payment method.

2. Description of the Related Art

In order to authenticate access attempts to diverse services that include local and remote network access services, an extensible authentication protocol (EAP) provides a general frame work.

Here, EAP is an authentication system characterized by a point-to-point protocol (PPP) and designed to achieve an easy extension. In a link setting process through PPP connection between a network access server (NAS) and a terminal, a problem occurs in that the NAS should prescribe a region for indicating types of an authentication protocol in a link control protocol (LCP) whenever an authentication server connected to the NAS itself uses the authentication protocol.

In order to solve this problem, types of the authentication protocol, such as a transport layer security (TLS), one-time password (OTP), token card, and others, are indicated in an EAP header, and thus the NAS can easily perform the extension only through the EAP irrespective of the authentication system. Through the EAP, the use of a smart card, a Kerberos, a public key, an OTP password, and a TLS becomes possible.

The architecture that uses the EAP minimizes direct participation of a client through an auto login and so on. That is, in case of requesting a service, a client name/password acquired from a service provider or an authentication certificate is used.

However, the conventional EAP-based auto login requires a client to join a proper service provider directly or indirectly. Accordingly, only a pre-pay or fixed pay system can be adopted on the assumption that the client joins the service provider.

In specified services such as wireless Internet platform for interoperability (WiFi) hotspot and so on, the login based on a credit card is permitted in a custom subscription or a pay-per-use cost. However, these services are performed on an ad-hoc basis, or require a direct participation of a client that is time consuming. Further, the client should provide information on his/her credit card to a third party at the risk of information leakage.

Typically, in a ubiquitous network environment where a client frequently requires services which the client is not subscribed to, extension to the ubiquitous computing technology is limited since the client cannot belong to all possible services in advance.

In the case where a client has a valid credit card account, a new EAP method, which enables the client to access a specified service, requires a continuous access to the corresponding service even if the client is not a subscriber of the corresponding service.

SUMMARY OF THE INVENTION

Aspects of the present invention solve the above drawbacks and/or other problems associated with the conventional arrangement. An aspect of the present invention is to provide a method and a system for authenticating a pay-per-use service using an EAP that enables a user to perform an authentication of the pay-per-use service even if the user is a non-subscriber of a specified service.

Additional aspects and/or advantages of the invention will be set forth in part in the description which follows and, in part, will be obvious from the description, or may be learned by practice of the invention.

According to an aspect of the present invention, there is provided a method for authenticating a pay-per-use service using an extensible authentication protocol (EAP), which comprises requesting a client to provide an extensible authentication protocol (EAP) ID to be used in the service when a service request signal is received from a client; transmitting an EAP payment method (EAP_CC) request signal to request management information of the client when the EAP ID is received; after receiving an EAP_CC response signal that includes the management information of the client, retransmitting the EAP_CC response signal to an authentication/authorization/accounting (AAA) backend server that possesses the management information of the client; and after receiving an EAP_CC approval signal approving the service request of the client from the AAA backend server, retransmitting the EAP_CC approval signal to the client.

The EAP_CC request signal may, although not necessarily, comprise one or any combination of a service cost, an explanation of an additional part of the service, an ID of a service access point, an EAP ID of the client, and a nonce value for security.

The EAP_CC response signal may, although not necessarily, be a result of substituting information on the service request and a client secret in a one-way hash function.

The client secret may, although not necessarily, comprise one or any combination of a credit card number of the client, an expiration date of the credit card, a card holder name, and security code.

The method may, although not necessarily, further comprise the AAA backend server authenticating the request from the client and making a charge to an account of the client.

The EAP_CC approval signal may, although not necessarily, be a result of substituting response information against the request from the client and a client secret in a one-way hash function.

The response information may, although not necessarily, comprise one or any combination of a service cost, an explanation of an additional part of the service, an ID of a service access point, an EAP ID of the client, and a nonce value for security.

According to another aspect of the present invention, there is provided a service access point, which comprises a transmission unit to transmit a signal requesting a client to provide an extensible authentication protocol (EAP) ID to be used in the service when a service request signal is received from a client; and a reception unit to receive the EAP ID from the client; wherein the transmission unit transmits an EAP payment method (EAP_CC) request signal to request management information of the client, the reception unit retransmits an EAP_CC response signal that includes the management information of the client to an authentication/authorization/accounting (AAA) backend server that possesses the management information of the client after receiving the EAP_CC response signal; and the reception unit retransmits an EAP_CC approval signal approving the service request of the client if the EAP_CC approval signal is received from the AAA backend server.

The EAP_CC request signal may, although not necessarily, comprise one or any combination of a service cost, an explanation of an additional part of the service, an ID of a service access point, an EAP ID of the client, and a nonce value for security.

The EAP_CC response signal may, although not necessarily, be a result of substituting information on the service request and a client secret in a one-way hash function.

The client secret may, although not necessarily, comprise one or any combination of a credit card number of the client, an expiration date of the credit card, a card holder name, and a security code.

The AAA backend server may, although not necessarily, authenticate the request from the client and make a charge to an account of the client.

The EAP_CC approval signal may, although not necessarily, be a result of substituting response information against the request from the client and a client secret in a one-way hash function.

The response information may, although not necessarily, comprise one or any combination of a service cost, an explanation of an additional part of the service, an ID of a service access point, an EAP ID of the client, and a nonce value for security.

According to still another aspect of the present invention, there is provided a system for authenticating a pay-per-use service using an extensible authentication protocol (EAP), which comprises a service access point to request an EAP ID to be used in the service to a client when a service request signal is received from the client, transmitting an EAP payment method (EAP_CC) request signal to request management information of the client if the EAP ID is received, and receiving an EAP_CC response signal that includes the management information of the client; and an authentication/authorization/accounting (AAA) backend server to transmit an EAP_CC approval signal approving the service request of the client to the service access point after receiving the EAP_CC response signal transmitted by the service access point; wherein the service access point retransmits the EAP_CC approval signal to the client after receiving the EAP_CC approval signal.

The EAP_CC request signal may, although not necessarily, comprise one or any combination of a service cost, an explanation of an additional part of the service, an ID of a service access point, an EAP ID of the client, and a nonce value for security.

The EAP_CC response signal may, although not necessarily, be a result of substituting information on the service request and a client secret in a one-way hash function.

The client secret may, although not necessarily, comprise one or any combination of a credit card number of the client, an expiration date of the credit card, a card holder name, and security code.

The AAA backend server may, although not necessarily, authenticate the request from the client and make a charge to an account of the client.

The EAP_CC approval signal may, although not necessarily, be a result of substituting response information against the request from the client and a client secret in a one-way hash function.

The response information may comprise one or any combination of a service cost, an explanation of an additional part of the service, an ID of a service access point, an EAP ID of the client, and a nonce value for security.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 1 is a flowchart illustrating an authentication method using an extensible authentication protocol (EAP) according to an embodiment of the present invention.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a flowchart illustrating an authentication method using an extensible authentication protocol (EAP) according to an embodiment of the present invention. Referring to FIG. 1, an EAP payment method (EAP_CC) protocol, which is performed centering around a client 10, a service access point (SAP) 20, and an authentication/authorization/accounting (AAA) backend server 30, are shown. In the present embodiment, the payment method is a credit card, though other forms of online payment may be used (such as a cash card, a debit card, and a PayPal system).

The AAA backend server 30 may belong to a credit card company, and the client 10 may be a person who has a card issued by the credit card company. An EAP communication by PANA, IEEE 802.1X or PPP is performed between the client 10 and the service access point 20, and an EAP communication by remote authentication dial-in user services (RADIUS) or Diameter is performed between the service access point 20 and the AAA backend server 30.

Here, RADIUS means an execution of user identification and authentication by sending information such as a user ID or password and an IP address to an authentication server when an access is requested by a remote user. Since the opportunity of remotely accessing the server through public lines or Internet is increasing, the user authentication system should be impeccable.

Since RADIUS authenticates only a rightful user even if a password is changed when the access is performed, an illegal use of the service can be prevented even if the password is disclosed. According to RADIUS, different password generation methods are used, and thus various types of products exist. That is, there exists a time synchronization type authentication system in which a password generator and an authentication server are synchronized at predetermined intervals to change the password, and a challenge-response type authentication system in which a random number generated by a server is encrypted and superimposed on the password.

Here, the password generator may be classified into an ID card type that is convenient for carrying and a software type that can be installed in a PC, and thus the user authentication can be performed inside and outside a house or a company.

On the other hand, Diameter is an information protection technology that has recently been proposed among AAA technologies required to provide a roaming service to mobile Internet and mobile IP subscribers. Diameter overcomes the limitations of the existing protocols, and has features such as a mobility support between domains required for the roaming, enhanced security providing, reliability-based lower protocol accommodation, useful extension that can accommodate future services, and others. Diameter is an important technology to be applied to the wire/wireless Internet unification and the $4^{th}$ generation mobile communication system, and the standardization thereof has been under way by the IETF AAA Working Group.

The service access point 20 comprises a reception unit that receives signals from the client 10 and the AAA backend server 30, and a transmission unit that transmits specified signals to the client 10 and the AAA backend server 30.

Referring to FIG. 1, the client 10 first transmits a specified service request signal, which can be provided through a specified service access point 20, to the service access point 20 (S100).

Accordingly, the service access point 20 transmits an EAP ID request signal to the client 10 (S110). Then, the client 10 transmits a response signal to the requested EAP ID (S120). In transmitting the requested EAP ID response signal, the client 10 sets its own EAP ID. For example, the client 10 may set its EAP ID as john.doe@customer.visa.com by reflecting its own name.

The service access point 20, which has received the EAP_ID response signal from the client 10, transmits an EAP_CC request signal to the client 10 (S130). The service access point 20 informs the client of a service cost, an explanation of an additional part of the service (e.g., a service name), an ID of the service access point (e.g., SF012@AnyHot Spot.com), an EAP ID of the client, and a nonce value for security.

That is, the EAP_CC request signal may comprise the following contents.

*REQUEST=(cost|description|SAP_ID|Client EAP_ID|nonce1)

Thereafter, the client 10 transmits the EAP_CC response signal to the service access point 20 in response to the EAP_CC request signal (S140).

At this time, in transmitting the EAP_CC response signal, the client may transmit a value obtained by hashing the EAP_CC request information and client secret with a one-way hash function.

Here, the one-way hash function is a function for compressing an input value having a certain length to an output value having a predetermined length, and has the following properties. It is impossible in calculation to obtain an input value with respect to a given output value on the one-way hash function, and it is impossible in calculation to find another input value that causes the same output value with respect to a given input value. Also, on the one-way hash function, it is impossible in calculation to find two different input values that cause the same output value.

The hash function that satisfies the above-described properties is one of important functions applied in data integrity, authentication, denial prevention, and others. In the present embodiment, the one-way hash function is "HMAC SHA-1".

The client secret may comprise a credit card number, an expiration date of the credit card, a card holder name, security code, and others. Accordingly, the client secret and the hash value transmitted in operation S140 may be as follows.

*client_secret=
    (credit_card_number|expiration_date|card_holder_name)
*hash=HMAC-SHA1(request, client_secret)

Thereafter, the service access point retransmits the received EAP_CC response signal to the AAA backend server 30 (S150). In retransmitting the EAP_CC response signal, the service access point will transmit the EAP_CC response signal to the AAA backend server 30 owned by a company that issued the credit card of the client 10 according to information on the service requested by the client 10 and/or information included in the client secret.

The AAA backend server 30 authenticates the request from the client 10, which is included in the transmitted EAP_CC response signal, and makes a charge to the credit cart account of the client 10.

In authenticating the request from the client 10, the AAA backend server 30 confirms the credit card number of the client from the information that is included in the client secret included in the received EAP_CC response signal, and confirms whether the confirmed card number coincides with the credit card number issued by the corresponding company.

If the authentication of the client is performed by the AAA backend server 30, an EAP_CC approval signal is produced in the AAA backend server 30. The produced EAP_CC approval signal is used to inform the service access point 20 and the client 10 of the approval of the service. That is, the AAA backend server 30 transmits the EAP_CC approval signal to the service access point 20 (S160), and accordingly, the service access point 20 retransmits the transmitted EAP_CC approval signal to the client (S170).

Here, the EAP_CC approval signal corresponds to a value obtained by hashing response information regarding the request signal from the client and the client secret in a one-way hash function.

In addition, the response information of the AAA backend server 30 may comprise a service cost, an explanation of an additional part of the service (e.g., a service name), an ID of the service access point (e.g., SF012@AnyHot Spot.com), an EAP ID of the client, and a nonce value for security. Also, the client secret may include the credit card number, expiration date, the card holder name, and security code. Therefore, the client secret, the response information, and the hash value transmitted in operation S160 may be as follows:

*client_secret=
    (credit_card_number|expiration_date|card_holder_name)
*response=(cost|desription|SAP_ID|Client_ID|nonce2)
*hash=HMAC-SHA1(response, client_secret)

As described above, the method of authenticating a pay-per-use service using the EAP according to an embodiment of the present invention makes it possible to advertise the service information (e.g., costs and so on). In addition, according to an embodiment of the present invention, it is possible to extend AAA routing from the service provider to another object (e.g., an AAA backend server owned by a credit card company). Accordingly, a so-called "AAA web-of-trust" is increased in comparison to the existing system which assumes that the client joins the service provider.

The EAP_CC is useful in any platform that unifies EAP frame works, and the EAP is a newly rising technology that is reputed in wireless access networks. Since ubiquitous computing converges to the access capability to diverse services in the neighborhood of a client, the method of authenticating a pay-per-user service using the EAP according to an embodiment of the present invention is very important.

Since many clients and service providers have accounts with credit card companies, the service authentication based on the credit card can be easily used these days. In addition, the EAP_CC according to an embodiment of the present invention is a stable and efficient method that can apply such authentication as discussed above usefully for IP-based services.

In addition, according to an embodiment of the present invention, the same model can be extendable to not only a credit card based on the AAA but also a cash card and a PayPal system.

As described above, according to an embodiment of the present invention, a client, under ubiquitous computing environment, can obtain the authentication of a pay-per-use service using the EAP even if the client is not a subscriber of any specified service in every place.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of a service access point for authenticating a pay-per-use service using an extensible authentication protocol (EAP), the service access point including a processor to implement the method comprising:
   receiving a request, from a client, for a pay-per-use service provided by the service access point;
   requesting the client to provide an extensible authentication protocol identification (EAP ID) to be used in the pay-per-use service;
   in response to receiving the EAP ID, transmitting an EAP credit card (EAP_CC) request signal to request account information of the client;
   receiving, from the client, an EAP_CC response signal comprising a hashed client secret including account information of the client that has been hashed with a one-way hash function;
   simultaneously transmitting the EAP_CC response signal including the hashed client secret and the EAP ID to an authentication/authorization/accounting (AAA) backend server that possesses the account information of the client and the one-way hash function;
   receiving an EAP_CC approval signal indicating that the AAA backend server successfully charged an account of the client; and
   in response to receiving the EAP_CC approval signal from the AAA backend server; transmitting the requested pay-per-use service to the client, wherein
   the EAP_CC request signal comprises a service cost, an explanation of an additional part of the server, an ID of the service access point, an EAP ID of the client, and a nonce value for security.

2. The method as claimed in claim 1 further comprising transmitting the EAP_CC approval signal to the client after receiving the EAP_CC approval signal from the AAA backend server.

3. The method as claimed in claim 1, further comprising the AAA backend server authenticating the request from the client.

4. The method as claimed in claim 1, wherein the EAP_CC approval signal comprises one or any combination of a response information, the client secret, and a value obtained by hashing the response information and the client secret in a one-way hash function.

5. The method as claimed in claim 4, wherein the response information comprises one or any combination of the service cost, an explanation of an additional part of the service, the ID of the service access point, the EAP ID of the client, and a nonce value for security.

6. A service access point comprising:
   a transmission unit transmitting signals to a client and to an authentication/authorization/accounting (AAA) backend server;
   a reception unit receiving signals from the client and the AAA backend server; and
   a processor to control the transmission unit and the reception unit, wherein:
   the reception unit receives a request, from the client, for a pay-per-use service provided by the service access point,
   the transmission unit transmits a request for an extensible authentication protocol identification (EAP ID) to be used in the pay-per-use service;
   in response to receiving the EAP ID, the transmission unit transmits an EAP credit card (EAP_CC) request signal to request account information of the client,
   the reception unit receives an EAP_CC response signal comprising a hashed client secret including account information of the client that has been hashed with a one-way hash function,
   the transmission unit simultaneously transmits the EAP_CC response signal that comprises the hashed client secret and the EAP ID to the AAA backend server that possesses the account information of the client and the one-way hash function,
   the reception unit receives an EAP_CC approval signal indicating that the AAA backend server successfully charged an account of the client,
   in response to receiving the EAP_CC approval signal from the AAA backend server, the transmission unit transmits the requested pay-per-use service to the client, and
   the EAP_CC request signal comprises the service cost, an explanation of an additional part of the service, an ID of the service access point, an EAP ID of the client, and a nonce value for security.

7. The service access point as claimed in claim 6, wherein the transmission unit transmits a signal requesting the EAP ID of the client after the service request from the client is received, and the reception unit receives the EAP ID of the client prior to the transmission unit transmitting the EAP_CC request information.

8. The service access point as claimed in claim 6, wherein the transmission unit transmits the EAP_CC approval signal to the client after receiving the EAP_CC approval signal from the AAA backend server.

9. The service access point as claimed in claim 6, wherein the AAA backend server further authenticates the request from the client.

10. The service access point as claimed in claim 6, wherein the EAP_CC approval signal comprises one or any combination of a response information, the client secret, and a value obtained by hashing the response information and the client secret with the one-way hash function.

11. The service access point as claimed 10, wherein the response information comprises one or any combination of the service cost, an explanation of an additional part of the service, the ID of the service access point, the EAP ID of the client, and a nonce value for security.

12. A system for authenticating a pay-per-use service using an extensible authentication protocol (EAP), the system comprising:
   a service access point (SAP) comprising a processor that is configured to control the SAP to receive a request, from a client, for a pay-per-use service provided by the SAP, to request a client to provide an extensible authentications protocol identification (EAP ID) to be used in the pay-per-use service, in response to receiving the EAP ID, to transmit an EAP credit card (EAP_CC) request signal to request account information of the client, to receive an EAP_CC response signal comprising a hashed client secret including account information of the client that has been hashed with a one-way hash function, and to simultaneously transmit the EAP_CC response signal including the hashed client secret and the EAP ID to an authentication/authorization/accounting (AAA) server; and the authentication/authorization/accounting (AAA) backend server for transmitting an EAP_CC approval signal, to the service access point, indicating that the AAA backend server successfully charged an account of the client, wherein:

in response to receiving the indication that the AAA backend server successfully charged the account of the client, the SAP transmits the requested pay-per-use service to the client, and the EAP CC request signal comprises a service cost, an explanation of the additional part of the service, an ID of the service access point, an EAP ID of the client, and a nonce value for security.

13. The system as claimed in claim 12, wherein the service access point transmits the EAP_CC approval signal to the client after receiving the EAP_CC approval signal.

14. The system as claimed in claim 12, wherein the service access point requests the EAP ID to be used in the service to a client after receiving the service request signal, and the service access point receives the EAP ID from the client prior to transmitting the EAP_CC request signal to the client.

15. The system as claimed in claim 12, wherein the AAA backend server further authenticates the request from the client.

16. The system as claimed in claim 12, wherein the EAP_CC approval signal comprises one or any combination of a response information, the client secret, and a value obtained by hashing the response information and the client secret in a one-way hash function.

17. The system as claimed in claim 16, wherein the response information comprises one or any combination of the service cost, an explanation of an additional part of the service, the ID of the service access point, the EAP ID of the client, and a nonce value for security.

18. A method of a service access point for authenticating a pay-per-use service using an extensible authentication protocol (EAP), the service access point including a processor to implement the method comprising:

In response to receiving an extensible authentication protocol (EAP ID) from a client, requesting the client to provide EAP account information by transmitting an EAP credit card (EAP_CC) request signal;

receiving, from the client, an EAP_CC response signal comprising a hashed client secret including account information of the client that has been hashed with a one-way hash function;

simultaneously transmitting the EAP_CC response signal including the hashed client secret and the EAP ID to an authentication/authorization/accounting (AAA) backend server that possesses the account information of the client and the one-way hash function;

receiving an EAP_CC approval signal indicating the AAA backend server successfully charged an account of the client; and in response to receiving the EAP_CC approval signal from the AAA backend server, transmitting the requested pay-per-use service to the client, wherein the EAP_CC request signal comprises a service cost, an explanation of an additional part of the service, an ID of the service access point, and a nonce value for security.

19. The method as claimed in claim 18 further comprising transmitting the EAP_CC approval signal to the client after receiving the EAP_CC approval signal from the AAA backend server.

20. The method as claimed in claim 18, wherein the EAP_CC response signal further comprises an EAP ID for the client to use during the service.

21. The method as claimed in claim 20, wherein the EAP ID and client secret are stored in a central database.

22. The method as claimed in claim 18, further comprising prior to transmitting an EAP_CC request signal:

requesting the client to provide an EAP ID to be used in the service; and receiving the EAP ID from the client.

23. The method as claimed in claim 22 wherein the EAP ID and the management information are stored in a central database.

24. The method as claimed in claim 18 further comprising the AAA backend server authenticating the request from the client.

25. The method as claimed in claim 18, wherein the EAP_CC approval signal comprises one or any combination of a response information, the client secret, and a value obtained by hashing the response information and the client secret in a one-way hash function.

26. The method as claimed in claim 25, wherein the response information comprises one or any combination of the service cost, an explanation of an additional part of the service, the ID of the service access point, an EAP ID of the client, and a nonce value for security.

27. A method of a service access point for authenticating a pay-per-use service using an extensible authentication protocol (EAP), the method comprising:

requesting a client to provide an extensible authentication protocol identification (EAP ID) and a EAP password to be used in the service when a service request signal is received from the client;

verifying the authentication of the client by matching the EAP ID and EAP password in a central database that stores previous clients' EAP IDs, EAP passwords, and respective management information;

simultaneously transmitting the EAP ID, the EAP password, and an EAP_CC response signal including a hashed client secret that includes account information of the client that has been hashed with a one-way hash function, to an authentication/authorization/accounting (AAA) backend server that possesses the account information of the client and the one-way hash function;

receiving an EAP_CC approval signal indicating that the AAA backend server successfully charged an account of the client; and in response to receiving the EAP_CC approval signal from the AAA backend server, transmitting the requested pay-per-use service to the client, wherein the response information comprises a service cost, an explanation of an additional part of the service, an ID of the service access point, an EAP ID of the client, and a nonce value for security.

28. The method as claimed in claim 27 further comprising transmitting the EAP_CC approval signal to the client after receiving the EAP_CC approval signal from the backend server.

29. The method as claimed in claim 27, further comprising the AAA backend server authenticating the request from the client.

30. The method as claimed in claim 27, wherein the EAP_CC approval signal comprises one or any combination of a response information, the client secret, and a value obtained by hashing the response information and the client secret in a one-way hash function.

31. A service access point comprising:
a transmission unit transmitting signals to a client and to an authentication/authorization/accounting (AAA) backend server;
a reception unit receiving signals from the client and the AAA backend server;
a central database unit storing an extensible authentication protocol identification (EAP ID), an EAP password, and respective account information; and
a processor configured to control the transmission unit, the reception unit, and the central database unit, wherein:
the reception unit receives a request, from the client, for a pay-per-use service provided by the service access point,
the transmission unit transmits an EAP ID request signal, the reception unit receives the EAP ID,
the central database unit verifies the authenticity of the client by matching the EAP ID and EAP password,
the central database unit provides the account information of the client,
the transmission unit simultaneously transmits the EAP ID, the EAP password, and an EAP_CC response signal that comprises a hashed client secret that includes account information of the client that has been hashed with a one-way hash function, to the AAA backend server that possesses the account information of the client and the one-way hash function,
the reception unit receives an EAP_CC approval signal indicating that the AAA backend server successfully charged an account of the client,
in response to receiving the indication that the AAA backend server successfully charged the account of the client, the transmission unit transmits the requested pay-per-use service to the client, and
the response information comprises a service cost, an explanation of an additional part of the service, an ID of the service access point, an EAP ID of the client, and a nonce value for security.

32. The service access point as claimed in claim 31, wherein the transmission unit transmits the EAP_CC approval signal to the client after receiving the EAP_CC approval signal from the AAA backend server.

33. The service access point as claimed in claim 31 further comprising the AAA backend server authenticating the request from the client.

34. The service access point as claimed in claim 31, wherein the EAP_CC approval signal comprises one or any combination of a response information, the client secret, and a value obtained by hashing the response information and the client secret in a one-way hash function.

* * * * *